(12) United States Patent
Song et al.

(10) Patent No.: US 12,160,143 B2
(45) Date of Patent: Dec. 3, 2024

(54) HIGH-VOLTAGE PERMANENT MAGNET FREQUENCY CONVERSION ALL-IN-ONE MACHINE

(71) Applicant: QINGDAO CCS ELECTRIC CORPORATION, Shandong (CN)

(72) Inventors: Chenglin Song, Shandong (CN); Hongbo Zhang, Shandong (CN); Xian Liu, Shandong (CN); Xufeng Yang, Shandong (CN)

(73) Assignee: QINGDAO CCS ELECTRIC CORPORATION, Shandong (CN)

( * ) Notice: Subject to any disclaimer, the term of this patent is extended or adjusted under 35 U.S.C. 154(b) by 271 days.

(21) Appl. No.: 17/796,344

(22) PCT Filed: Nov. 10, 2020

(86) PCT No.: PCT/CN2020/127879
§ 371 (c)(1),
(2) Date: Jul. 29, 2022

(87) PCT Pub. No.: WO2022/062103
PCT Pub. Date: Mar. 31, 2022

(65) Prior Publication Data
US 2023/0065347 A1    Mar. 2, 2023

(30) Foreign Application Priority Data
Sep. 22, 2020 (CN) .......................... 202011004069.3

(51) Int. Cl.
H02P 27/04 (2016.01)
H02K 11/30 (2016.01)
(Continued)

(52) U.S. Cl.
CPC .......... H02K 11/30 (2016.01); H02M 1/0009 (2021.05); H02P 6/00 (2013.01); H02P 27/08 (2013.01)

(58) Field of Classification Search
CPC ........ H02M 1/0009; H02P 6/00; H02P 27/08; H02P 21/22; H02P 1/02; H02P 2207/05
See application file for complete search history.

(56) References Cited

U.S. PATENT DOCUMENTS

2015/0002106 A1* 1/2015 Inagaki ................. H02M 7/493
322/79

FOREIGN PATENT DOCUMENTS

CN    101286726 A      10/2008
CN    103138675 A  *   6/2013
(Continued)

OTHER PUBLICATIONS

International Search Report for PCT/CN2020/127879 mailed on Jun. 18, 2021.

*Primary Examiner* — Karen Masih
(74) *Attorney, Agent, or Firm* — The PL Law Group, PLLC

(57) ABSTRACT

A high-voltage permanent magnet frequency conversion all-in-one machine according to an embodiment of the present disclosure includes a frequency converter configured to perform frequency conversion on a high-voltage alternating current, and output at least three alternating currents, a permanent magnet motor configured to receive the alternating currents subjected to the frequency conversion and output from the frequency converter, to drive the motor to operate, and a controller configured to control the frequency converter to perform the frequency conversion on the high-voltage alternating current, and control an operation state of the permanent magnet motor.

8 Claims, 5 Drawing Sheets

(51) Int. Cl.
*H02M 1/00* (2006.01)
*H02P 6/00* (2016.01)
*H02P 27/08* (2006.01)

(56) References Cited

FOREIGN PATENT DOCUMENTS

| | | | |
|---|---|---|---|
| CN | 203014685 U | * | 6/2013 |
| CN | 204681256 U | | 9/2015 |
| CN | 106787812 A | | 5/2017 |
| JP | 2002-101685 A | | 4/2002 |

* cited by examiner

HIGH-VOLTAGE PERMANENT MAGNET FREQUENCY CONVERSION ALL-IN-ONE MACHINE

CROSS REFERENCE TO RELATED APPLICATIONS AND CLAIM OF PRIORITY

This application claims benefit under 35 U.S.C. 119, 120, 121, or 365 (c), and is a National Stage entry from International Application No. PCT/CN2020/127879 filed on Nov. 10, 2020, which claims priority to the benefit of Chinese Patent Application No. 202011004069.3 filed in the Chinese Intellectual Property Office on Sep. 22, 2020, the entire contents of which are incorporated herein by reference.

BACKGROUND

1. Technical Field

The present disclosure generally relates to the field of motor applications. More specifically, the present disclosure relates to a high-voltage permanent magnet frequency conversion all-in-one machine.

2. Background of the Invention

At present, in the occasion of transportation by a main transportation belt or the like in an underground coal mine, a high-voltage permanent magnet motor of 6 to 10 KV is typically used as a power source. In use of the high-voltage permanent magnet motor, since an existing frequency converter cannot directly drive the high-voltage permanent magnet motor, a working mode of a 10 kV high-voltage asynchronous motor plus a controlled start transmission ("CST") is typically adopted. However, the motor in this working mode has the problems of difficult maintenance, high maintenance cost, small heavy-load starting torque, large impact on the power grid, and the like.

Further, a topology structure of the existing frequency converter mostly adopts the mode of direct series connection and multi-level output of power devices. In such a topology structure, the reliability is low, the power devices are vulnerable to damage, and the output harmonics are high. Although the multi-level output mode avoids many disadvantages of the direct series connection mode of power devices, the number of clamp diodes is multiplied as the number of levels increases, which undoubtedly increases the cost and reduces the operation reliability of the device.

The simplest topology structure of a 6-pulse rectifier matched with a two-level inverter is taken as an example for illustration. This topological structure is simple, but the output harmonic wave is high, leading to large impact on the power grid. In order to reduce the influence of harmonics on the power grid, a higher-order frequency converter may be designed with a 12-pulse, a 24-pulse, or a 48-pulse rectifier. However, such a phase-shifting rectifier transformer is large in size and high in cost, and has a high requirement for withstand voltage of the driven motor, which may easily cause burnout of the motor. In order to further smooth the current output from the inverter, the inverter may be designed to perform three-level, five-level, or even multi-level inversion. However, a current topology structure of such an inverter part is a single-output structure, and the higher the topology structure is, the more power devices are required, resulting in an oversized frequency converter, a higher cost and a more complex control mode.

In addition, during pre-charging of the frequency converter, in the prior art, the high-voltage alternating current cannot be directly used for charging of the energy storage capacitor, and a separate low-voltage charging circuit is typically provided for pre-charging, leading to a complex frequency converter circuitry and a high cost. Meanwhile, the energy storage capacitor has a large volume, and needs to meet the requirements of high-voltage charging, creepage distance and electric interval. As a result, the frequency converter has a large volume, and the energy storage capacitor is easy to burn out.

SUMMARY

In order to solve one or more of the problems mentioned in the Background section, the present disclosure provides a frequency conversion all-in-one machine which enables cooperative use of a high-voltage permanent magnet direct-drive synchronous motor and a high-voltage frequency converter. The frequency conversion all-in-one machine controls an inverter unit of the frequency converter by a controller, so that a high-voltage three-phase alternating current is subjected to frequency conversion, and a rotating speed of the permanent magnet direct-drive synchronous motor is changed. In addition, a permanent magnet motor stator winding of the frequency conversion all-in-one machine of the present disclosure is connected to a multi-path output end of the inverter unit of the frequency converter in a particular winding mode, to match a turn-off sequence of an insulated-gate bipolar transistor (IGBT) of the inverter unit, thereby driving the high-voltage permanent magnet motor to operate.

Specifically, the present disclosure provides a high-voltage permanent magnet frequency conversion all-in-one machine. The frequency conversion all-in-one machine includes: a frequency converter configured to perform frequency conversion on a high-voltage alternating current, and output at least three alternating currents; a permanent magnet motor configured to receive the alternating currents subjected to the frequency conversion and output from the frequency converter, to drive the motor to operate; and a controller configured to control the frequency converter to perform the frequency conversion on the high-voltage alternating current, and control an operation state of the permanent magnet motor.

In an embodiment, the frequency converter includes a rectifier unit, a direct-current loop and an inverter unit. The rectifier unit is configured to convert the high-voltage alternating current into a direct current: the direct-current loop includes a direct-current bus and an energy storage capacitor, and is configured to buffer and store the direct current output from the rectifier unit; and the inverter unit is configured to convert the direct current processed by the direct-current loop into at least three alternating currents to be output to the permanent magnet motor.

In another embodiment, the high-voltage alternating current has a voltage ranging from 6 to 10 KV.

In yet another embodiment, the frequency conversion all-in-one machine further includes hall current transformers. The hall current transformers are configured to collect the at least three alternating currents and output the collected signals to the controller to control the operation state of the permanent magnet motor.

In an embodiment, the frequency conversion all-in-one machine further includes a pre-charging circuit. The pre-charging circuit is arranged on an input end of the rectifier unit, and configured to pre-charge the energy storage capacitor in the direct-current loop through the high-voltage alternating current.

In another embodiment, the frequency conversion all-in-one machine further includes a bus voltage sampling circuit. The bus voltage sampling circuit is connected in parallel with the direct-current bus, and configured to sample a voltage value on the direct-current bus, and output a sampling result to the controller to control the frequency converter to perform frequency conversion on the high-voltage alternating current.

In yet another embodiment, the frequency conversion all-in-one machine further includes a reactor. The reactor is connected to an input end of the frequency converter, and configured to perform voltage stabilization and interference suppression on the high-voltage alternating current.

In an embodiment, the energy storage capacitor is packaged without a case and connected in a plug-in mode, to increase a withstand voltage value between terminals and case, as well as an electric interval, and reduce a volume of the frequency converter.

In another embodiment, a stator winding of the permanent magnet motor is connected to a multi-path output end of the inverter unit in a multi-winding star connection mode.

In yet another embodiment, the frequency conversion all-in-one machine further includes a static voltage equalizing circuit which is connected between terminals of the direct-current bus and configured to equalize a voltage of the inverter unit and discharge a voltage on the direct-current bus when the frequency converter is disconnected.

The frequency conversion all-in-one machine of the present disclosure has the advantages of simple structure, small whole machine volume, and stable and reliable operation. On the one hand, the energy storage capacitor of the frequency converter is packaged without a case, and a top end of the energy storage capacitor is packaged with metal fixing lugs, so that the fixing strength of the energy storage capacitor is effectively ensured on the premise of meeting the requirements on the withstand voltage between terminals and case, the creepage distance and the electric interval. On the other hand, the frequency conversion all-in-one machine of the present disclosure adopts a particular pre-charging circuit, so that the high-voltage current can be directly used for pre-charging of the energy storage capacitor, and the volume of the frequency conversion all-in-one machine is reduced. In addition, by means of a 4-path electromagnetic coupling technology in which the frequency converter is combined with the permanent magnet motor, the frequency conversion all-in-one machine of the present disclosure solves the technical problems of difficult low-speed control, difficult high-voltage driving, small starting torque, difficult IGBT voltage equalizing and the like in the existing frequency conversion all-in-one machines.

BRIEF DESCRIPTION OF THE DRAWINGS

The above features of the present disclosure may be better understood, and its numerous objects, features, and advantages will become apparent to those skilled in the art by reading the following detailed description with reference to the accompanying drawings. The drawings in the following description are merely some embodiments of the disclosure and, to one of ordinary skill in the art, other drawings may be derived from these drawings without any creative labor, in which.

DETAIL DESCRIPTION OF THE INVENTION

The technical solutions in the embodiments of the present disclosure will be described clearly and completely below with reference to the accompanying drawings. Obviously, the described embodiments are some, but not all, embodiments of the present disclosure. Based on the embodiments of the present disclosure, all the other embodiments obtained by those skilled in the art without any creative labor fall into the protection scope of the present disclosure.

Figure 1:
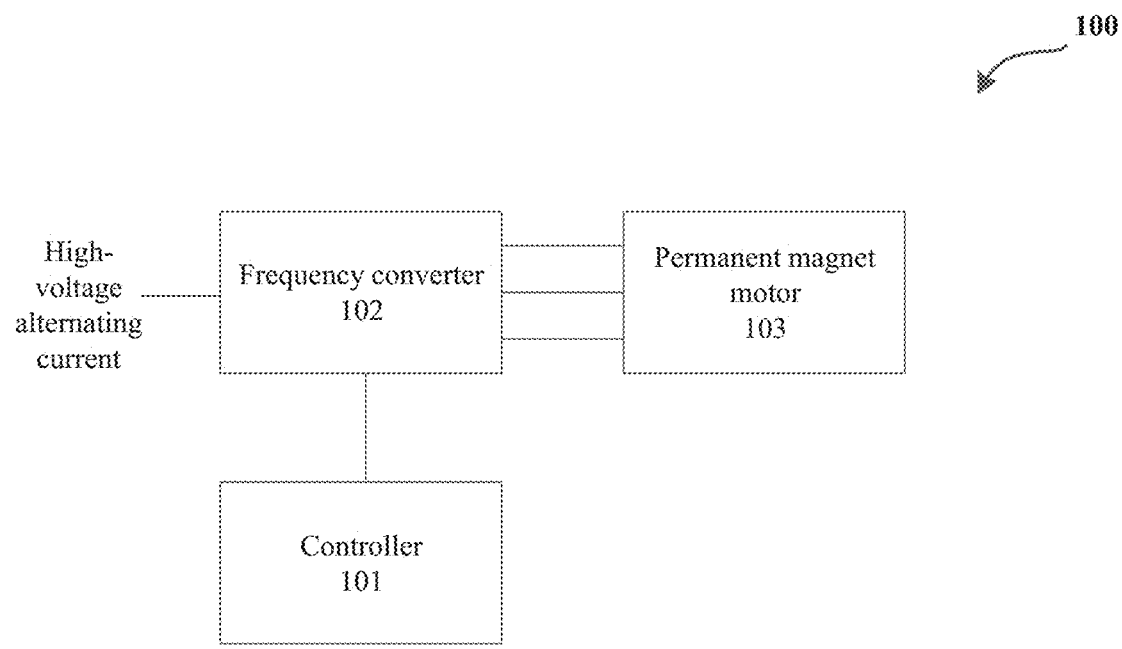
FIG. 1 is a block diagram showing components of a frequency conversion all-in-one machine according to an embodiment of the present disclosure.

FIG. 1 is a block diagram showing components of a frequency conversion all-in-one machine 100 according to an embodiment of the present disclosure. In order to better understand the function and principle of the frequency conversion all-in-one machine of the present disclosure, a high-voltage alternating current is also depicted in FIG. 1. The high-voltage alternating current may be, for example, a three-phase high-voltage alternating current of 10 KV that is configured to supply power to the frequency conversion all-in-one machine.

As shown in FIG. 1, the frequency conversion all-in-one machine 100 of the present disclosure may include: a controller 101, a frequency converter 102, and a permanent magnet motor 103. The frequency converter is configured to perform frequency conversion on a high-voltage alternating current, and output at least three alternating currents. The permanent magnet motor is configured to receive the alternating currents subjected to the frequency conversion and output from the frequency converter, to drive the motor to operate. The controller is configured to control the frequency converter to perform the frequency conversion on the high-voltage alternating current, and control an operation state of the permanent magnet motor.

In an embodiment, the high-voltage alternating current may be a high-voltage three-phase alternating current, where each phase of voltage differs from each other by 120 degrees in phase, and has a voltage ranging from 6 KV to 10 KV. In an application scenario, the frequency conversion all-in-one machine of the present disclosure may include a transformer that outputs the high-voltage three-phase alternating current. Specifically, the transformer may include an iron core (or magnetic core) and a coil. The coil includes two or more windings, in which a winding connected to the high-voltage power grid is a primary coil, while a winding connected to an input end of the frequency converter is a secondary coil. The transformer may perform transformation of alternating voltage, current and impedance. Generally, the high-voltage three-phase alternating current supplied from the high-voltage power grid may have a voltage as high as 100 KV or more, which is not suitable for use in equipment such as a motor. Therefore, the voltage needs to be reduced by the transformer to output the high-voltage three-phase alternating current of 6 to 10 KV to the frequency converter, so that matching between the alternating-current input voltage and the direct-current output voltage, as well as high-voltage electrical isolation between the high-voltage power grid and the rectifier unit of the frequency converter can be realized.

Figure 2:
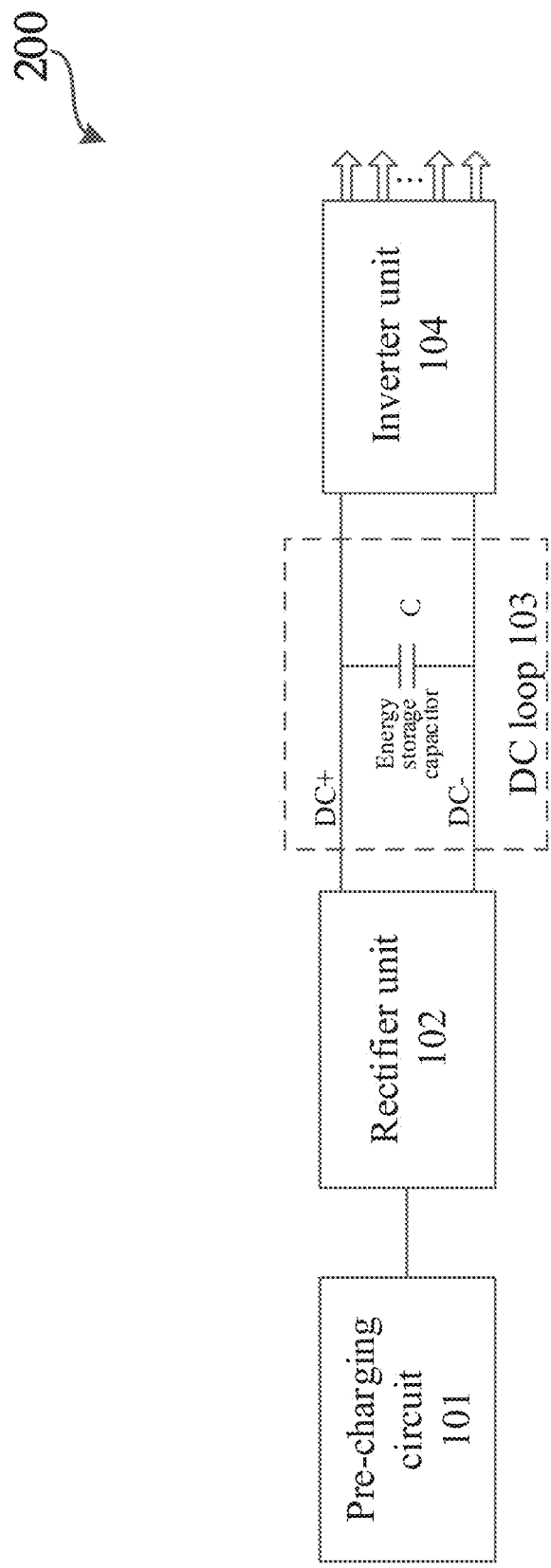
FIG. 2 is a block diagram showing components of a frequency converter according to an embodiment of the present disclosure.

FIG. 2 is a block diagram showing components of a frequency converter 200 according to an embodiment of the present disclosure.

As shown in FIG. 2, the frequency converter 200 of the present disclosure may include a pre-charging circuit 101, a rectifier unit 102, a direct-current loop 103, and an inverter unit 104. In an embodiment, the rectifier unit may include a rectification device and a filter. By means of a component having a unidirectional conductive characteristic, the rectifier may convert the alternating current, with a high voltage and variable direction and magnitude, output from the transformer into a unidirectional pulsating direct current. The filter is configured to filter out alternating current components in the pulsating direct current voltage.

In another embodiment, the direct-current loop may include a direct-current bus with DC+ and DC−, and an energy storage capacitor C, and is configured to buffer and store the direct current output from the rectifier unit. The inverter unit is configured to convert the direct current processed by the direct-current loop into at least three alternating currents to be output to the permanent magnet motor. In an application scenario, there may be 4 alternating currents output from the inverter unit, for example. The pre-charging circuit is arranged on an input end of the rectifier unit, and configured to pre-charge the energy storage capacitor C in the direct-current loop through the high-voltage alternating current.

Further, the direct-current loop may include a circuit composed of a plurality of energy storage elements such as capacitors and inductors, and may be located between the rectifier unit and the inverter unit. The capacitors may be, for example, electrolytic capacitors. When the frequency converter is powered up, before a voltage is established, the state of the electrolytic capacitors in the direct-current loop of the frequency converter at the moment of charging is equivalent to a short-circuit state. In this case, since the direct current voltage output from the rectifier unit is extremely high, the charging current is extremely high, which may cause damage to the rectifier diodes, the electrolytic capacitors on the direct-current bus, or other components of the frequency converter. For this reason, in order to prevent an excessive charging current, the electrolytic capacitors in the direct-current loop need to be pre-charged.

When the pre-charging of the electrolytic capacitors is completed, the rectifier unit may output the direct current to the inverter unit through the direct-current loop. Since the motor is an inductive load, the power factor is always not 1 no matter what operation state the motor is in. Therefore, there is always a reactive power exchange between the direct-current loop and the motor, and such reactive power is buffered through an energy storage element in the direct-current loop, so that the direct current voltage output from the rectifier unit always remains stable. Based on the above principle, the direct-current loop is configured to receive and store the direct current transmitted from the rectifier unit, and process the direct current by interference suppression or the like.

During operation of the frequency converter, firstly, the high-voltage alternating current output from the transformer, after being processed by the pre-charging circuit, is converted into a low-current alternating current. Then, the rectifier unit converts the low-current alternating current into a low-current direct current which is used to pre-charge the energy storage capacitor C in the direct-current loop. When the pre-charging is completed, the pre-charging circuit is disconnected, and then, the high-voltage alternating current output from the transformer is rectified by the rectifier unit, and output as a high-voltage direct current. Next, the high-voltage direct current, after being subjected to energy storage and processing such as interference suppression in the direct-current loop, flows to the inverter unit. Finally, the inverter unit inverts the high-voltage direct current to perform frequency conversion on the high-voltage direct current, and output the converted high-voltage direct current to the permanent magnet motor in multiple paths, thereby driving the permanent magnet motor to operate.

Figure 3:
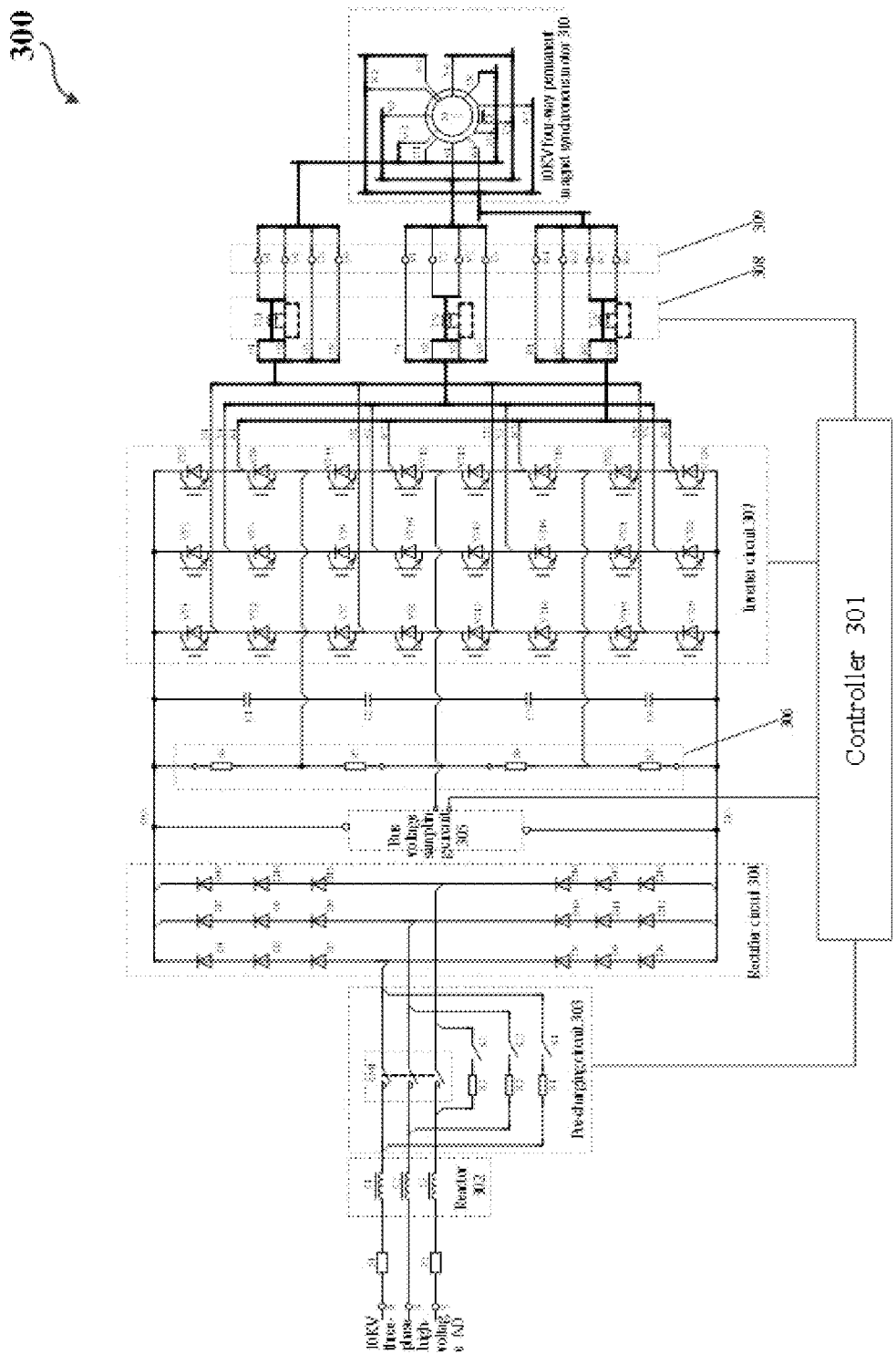
FIG. 3 is a schematic circuit diagram of a frequency conversion all-in-one machine according to an embodiment of the present disclosure.

FIG. 3 is a schematic circuit diagram of a frequency conversion all-in-one machine 300 according to an embodiment of the present disclosure.

As shown in FIG. 3, the frequency conversion all-in-one machine 300 of the present disclosure may include: a controller 301, a reactor 302, a pre-charging circuit 303, a rectifier circuit 304, a bus voltage sampling circuit 305, a static voltage equalizing circuit 306, a direct-current loop, an inverter circuit 307, a hall current transformer circuit 308, an interface circuit 309, and a 10 KV four-way permanent magnet synchronous motor 310.

In an embodiment, the reactor is arranged on an input end of the frequency conversion all-in-one machine, and configured for voltage stabilization, filtering, and interference suppression of a 10 KV high-voltage three-phase (R. S and T phases) alternating current input into the frequency conversion all-in-one machine, so that harmonic interference of the rectifier unit on the power grid is avoided. In addition, the reactor may be further configured to restrain short-circuit energy to prevent excessive energy loss of a preceding stage due to excessive short-circuit energy of a rear stage. Specifically, as shown in FIG. 3, the reactor may be composed of 3 inductors, L1, L2 and L3, which are respectively connected to an R-phase output terminal, an S-phase output terminal, and a T-phase output terminal of the 10 KV high-voltage three-phase alternating current. In order to implement short-circuit protection on the frequency conversion all-in-one machine, an input end of the reactor may be further connected to a high-voltage fuse, such as the high-voltage fuses F1 and F2 shown in FIG. 3, which have a capacity of 125 amps and are connected to the R-phase output terminal and the T-phase output terminal of the high-voltage three-phase alternating current, respectively.

In another embodiment, the pre-charging circuit may include a main switch KM1 and charging switches K1, K2 and K3. The charging switches K1, K2 and K3 may be, for example, 35 KV high-voltage relays that can withstand high voltage charging. Further, the charging switches may be respectively connected to current-limiting high-voltage resistors R1, R2, and R3 to prevent an excessive charging current, and the current-limiting high-voltage resistors R1, R2, and R3 are connected to the reactors L1, L2, and L3, respectively.

In an application scenario, when the frequency conversion all-in-one machine is powered up, the main switch KM1 is in an open state under the control of the controller, while the charging switches K1, K2 and K3 are all in a closed state. At this time, the R-, S- and T-phase voltages of the 10 KV high-voltage three-phase alternating current are respectively subjected to current limiting by the current-limiting resistors R1, R2 and R3, and then converted into a low-voltage direct current through the rectifier unit. Then, the low-voltage direct current starts to pre-charge the energy storage capacitor in the direct-current loop. When the pre-charging is completed, the controller detects that the voltage value on the direct-current bus reaches a set value, and then controls to close the main switch KM1. Next, the charging switches K1, K2, and K3 are delayed to be opened.

Finally, the 10 KV high-voltage three-phase alternating current flows through the main switch KM1 to the rectifier unit, and then is converted into a high-voltage direct current in the rectifier unit before being output to the inverter unit.

In yet another embodiment, the rectifier unit may be, for example, a rectifier circuit composed of a three-phase rectifier bridge. An input end of the rectifier unit is configured to receive the 10 KV high-voltage three-phase alternating current, and an output end of the rectifier unit is configured to output the rectified direct-current high-voltage current. Specifically, the three-phase rectifier bridge may be composed of 18 rectifier diodes, D1 to D18, The R-phase voltage is connected between a first upper bridge (composed of D1 to D3 in series) and a first lower bridge (composed of D4 to D6 in series): the S-phase voltage is connected between a second upper bridge (composed of D7 to D9 in series) and a second lower bridge (composed of D10 to D12 in series); and the T-phase voltage is connected between a third upper bridge (composed of D13 to D15 in series) and a third lower bridge (composed of D16 to D18 in series). Further, output ends of the rectifier diodes D1, D7 and D13 are connected at one point to serve as the DC+ terminal of the direct-current bus; and input ends of the rectifier diodes D6, D12 and D18 are connected at one point to serve as the DC− terminal of the direct-current bus. The working principle of the rectifier circuit is briefly described below.

The output current of the rectifier circuit at any time flows out from the rectifier diode connected to the phase with the highest potential of the three-phase power, through the load to the rectifier diode connected to the phase with the lowest potential, and finally back to the power supply. For example, in the case of 0 to 30 degrees, since the T phase has the highest potential and the S phase has the lowest potential, the rectifier diodes D15, D14, D13, and D12, D11, D10 remain in the on state throughout this period, while the rest of the diodes are in the off state. Therefore, the current at this time is output from the T phase, and flows through D15, D14 and D13 in sequence, through the load, and back to the S phase through D12, D11 and D10 in sequence. Then, the T phase output is the output of the rectifier circuit.

In the case of 30 to 90 degrees, since the R phase has the highest potential and the S phase has the lowest potential, the rectifier diodes D3, D2, D1, and D12, D11, D10 remain in the on state throughout this period, while the rest of the diodes are in the off state. Therefore, the current at this time is output from the R phase, and flows through D3, D2 and D1 in sequence, through the load, and back to the S phase through D12, D11 and D10 in sequence. Then, the R phase output is the output of the rectifier circuit.

Further, in the case of 90 to 150 degrees, since the R phase has the highest potential and the T phase has the lowest potential, the rectifier diodes D3, D2, D1, and D18, D17, D16 remain in the on state throughout this period, while the rest of the diodes are in the off state. Therefore, the current at this time is output from the R phase, and flows through D3, D2 and D1 in sequence, through the load, and back to the T phase through D18, D17 and D16 in sequence. Then, the R phase output is the output of the rectifier circuit. By analogy, the output of the rectifier circuit in the case of 150 to 360 degrees can be obtained. According to the above, through the alternate conduction of the three groups of rectifier diodes, the 10 KV high-voltage three-phase alternating current is finally converted into a high-voltage direct current by the rectifier circuit.

In an embodiment, the bus voltage sampling circuit may include an isolation power supply and a high-voltage sampling circuit. The bus voltage sampling circuit is connected in parallel between the DC+ terminal and the DC− terminal of the direct-current bus, and configured to sample a high voltage on the direct-current bus, and by converting the high voltage into a low voltage by the isolation power supply, further output a sampling signal to the controller. After receiving the sampling signal, the controller analyzes and processes the sampling signal, and then controls the frequency converter to perform frequency conversion on the high-voltage alternating current. The controller may further control, according to the analysis and processing results, turn-on and turn-off of the pre-charging circuit, or may provide overvoltage protection for the frequency conversion all-in-one machine. Preferably, the bus voltage sampling circuit may communicate with the controller via a fiber optic link.

In another embodiment, the direct-current loop may include a circuit composed of a direct-current bus and an energy storage capacitor. As shown in FIG. 3, the direct-current bus is composed of a DC+ terminal and a DC− terminal, and the energy storage capacitor may include C1, C2, C3, and C4. It will be appreciated that depending on different application scenarios, the energy storage capacitor in the direct-current loop in FIG. 3 may be replaced with an energy storage inductor or other energy storage components, and a plurality of energy storage capacitors may be provided.

In yet another embodiment, the static voltage equalizing circuit is connected between the DC+ terminal and the DC− terminal of the direct-current bus, and configured to equalize a voltage of the inverter unit and discharge a voltage on the direct-current bus when the frequency converter is disconnected. Specifically, as shown in FIG. 3, the static voltage equalizing circuit may include a circuit composed of high voltage resistors R4 to R7. After divided by the high-voltage resistors R4-R7, the voltage on the direct-current bus is loaded to each IGBT module in the inverter unit to ensure voltage balance of each IGBT module in a static state, and prevent the IGBT module from being burn out. Further, when the frequency conversion all-in-one machine is powered off, a discharging operation needs to be performed by the high-voltage resistors R4-R7 to ensure operation safety. Meanwhile, the energy storage capacitors C1, C2, C3 and C4 can also be discharged through a loop composed of the high-voltage resistors R4-R7.

In an embodiment, the inverter unit may include an inverter circuit composed of a plurality of inverter bridges, which may be further composed of a plurality of insulated-gate bipolar transistor ("IGBT") modules. Specifically, the inverter unit may include an inverter bridge, a logic control circuit, and a filter circuit, and may be configured to convert the direct current output from the direct-current loop into an alternating current with fixed frequency and voltage or variable frequency and voltage, for use in the permanent magnet motor. Furthermore, the inverter bridge may include an input interface, a voltage start loop, a power switch element, a direct-current conversion loop, a feedback loop, and other parts. The logic control circuit may include a pulse width modulation controller, a carrier wave generator, a modulation wave generator, and the like, and may be arranged in the controller, or have functions that can be implemented by the controller.

During operation of the inverter unit, the inverter bridge plays a key role in the process of converting the direct current into the three-phase alternating current. The inverter bridge may control, through the pulse width modulation signal generated by the logic control circuit, turn-on or turn-off of power switch elements on an upper bridge and a lower bridge of the inverter bridge, so that a three-phase alternating current with a phase difference of 120° between three output ends of the inverter bridge is obtained to output the alternating current to the motor. In an embodiment, the power switch elements may be, for example, insulated-gate bipolar transistors ("IGBTs") which have the advantages of high input impedance and low turn-on voltage.

The inverter unit is connected to the controller via a communication line. For example, the inverter unit may be communicated with the inverter unit through an RS-485 serial bus. The controller is configured to receive and process signals transmitted from the inverter unit and the bus voltage sampling circuit, and transmit a control signal to the inverter unit according to the processing result, to control the IGBTs to be turned on in turn. Thereby, the frequency of the alternating current output from the inverter unit may be changed, and the rotating speed of the motor is further controlled.

In an embodiment, the inverter circuit may include 24 IGBT modules, VT1 to VT24, and the inverter circuit may include 4 paths of output. Among them, VT1 to VT6 form a first path of three-phase output U1, V1 and W1: VT7 to VT12 form a second path of three-phase output U2, V2 and W2: VT13 to VT18 form a third path of three-phase output U3, V3 and W3; and VT19 to VT24 form a fourth path of three-phase output U4, V4 and W4. It should be noted that depending on the input voltage value and the connection mode of the windings of the permanent magnet motor, the inverter unit of the present disclosure may have more paths of output. The working principle of the inverter circuit will be briefly described below taking the first path of three-phase output U1, V1 and W1 as an example.

For convenience of description, one cycle time is divided into t1 to t6. For a voltage $U_{UV}$ between the U phase and the V phase, VT1 and VT4 are simultaneously turned on from t1 to t2, and then, the U phase voltage is "+", and the V phase voltage is "−", so $U_{UV}$ is "+", and an amplitude of $U_{UV}$ is the voltage value of the bus. From t4 to t5, VT2 and VT3 are simultaneously turned on, and then, the U phase voltage is "−", and the V phase voltage is "+", so $U_{UV}$ is "−", and an amplitude of $U_{UV}$ is the voltage value of the bus.

For a voltage $U_{VW}$ between the V phase and the W phase, VT3 and VT6 are simultaneously turned on from t3 to t4, and then, the V phase voltage is "+", and the W phase voltage is "−", so $U_{VW}$ is "+", and an amplitude of $U_{VW}$ is the voltage value of the bus. From t6 to t1, VT4 and VT5 are simultaneously turned on, and then, the V phase voltage is "−", and the W phase voltage is "+", so $U_{VW}$ is "−", and an amplitude of $U_{VW}$ is the voltage value of the bus.

For a voltage $U_{WU}$ between the W phase and the U phase, VT5 and VT2 are simultaneously turned on from 15 to t6, and then, the W phase voltage is "+", and the U phase voltage is "−", so $U_{WU}$ is "+", and an amplitude of $U_{WU}$ is the voltage value of the bus. From t2 to t3, VT1 and VT6 are simultaneously turned on, and then, the W phase voltage is "−", and the U phase voltage is "+", so $U_{WU}$ is "−", and an amplitude of $U_{WU}$ is the voltage value of the bus.

It can be seen from the above analysis that $U_{UV}$, $U_{VW}$ and $U_{WU}$ differ from each other by 120 degrees in phase, and the amplitudes of $U_{UV}$, $U_{VW}$ and $U_{WU}$ all equal to the voltage value of the direct-current bus. Therefore, a direct current can be inverted into a three-phase alternating current as long as the turn-on and turn-off of the 6 IGBTs is controlled according to a certain rule. Further, the inverted current frequency can be adjusted by changing a change cycle of the control signals with the controller on the premise that the above conduction rule remains unchanged. The working principle of the second, third and fourth paths of output of the inverter circuit is the same as that of the first path of output described above, and is not repeated here.

In an embodiment, the frequency conversion all-in-one machine may further include a hall current transformer circuit which may include hall current transformers and accompanying circuits. The hall current transformers are configured to collect the three-phase alternating current output from the inverter unit, and output the collected current signals to the controller to control the operation state of the permanent magnet motor. Specifically, as shown in FIG. 3, the hall current transformers may include TA1, TA2, and TA3, which are respectively connected to the U phase, the V phase, and the W phase of the three-phase alternating current output from the inverter unit.

Further, the current output from a U1 phase and a U2 phase flows through the hall current transformer TA1: the current output from a V1 phase and a V2 phase flows through the hall current transformer TA2; and the current output from a W1 phase and a W2 phase flows through the hall current transformer TA3. The hall current transformers TA1, TA2 and TA3 are connected to the controller via communication lines. For example, the hall current transformers TA1, TA2 and TA3 may be communicated with the controller through an RS-485 serial bus. The controller is configured to receive and process signals from the hall current transformers, and monitor an operation state of the motor according to the processing result, while providing overcurrent, overload and short-circuit protection for the frequency conversion all-in-one machine.

Figure 4:
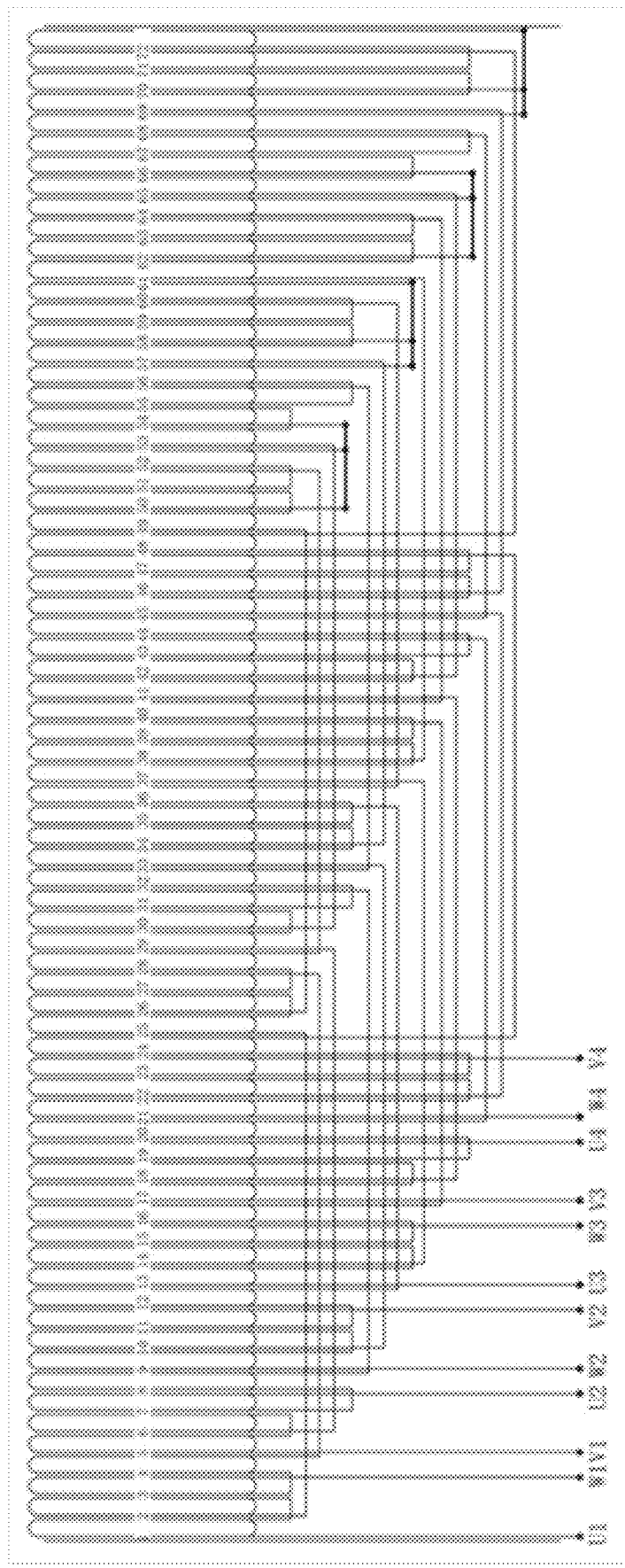
FIG. 4 is a diagram showing connection of a stator winding of a permanent magnet motor according to an embodiment of the present disclosure.

FIG. 4 is a diagram showing connection of a stator winding of a permanent magnet motor according to an embodiment of the present disclosure. The winding connection of the permanent magnet motor of the present disclosure will be described below with reference to FIGS. 3 and 4.

As shown in FIGS. 3 and 4, the permanent magnet motor of the present disclosure may include a stator having a coil winding wound thereon, and a rotor having no coil winding. Specifically, the permanent magnet motor may be a 10 KV four-way permanent magnet synchronous motor, and have a stator on which 4 sets of windings are wound. Corresponding to the connection terminals in the interface circuit shown in FIG. 3, the 4 sets of windings have 12 connection terminals, i.e., U1, V1, W1: U2, V2, W2; U3, V3, W3; and U4, V4, W4.

The 4 sets of windings are connected in a star connection mode, in which the other ends of the three-phase ends U1, V1 and W1 are connected together: the other ends of U2, V2 and W2 are connected together: the other ends of U3, V3 and W3 are connected together; and the other ends of U4, V4 and W4 are connected together. Further, the 12 connection terminals of the 4 sets of windings are respectively connected to the 12 connection terminals of the interface circuit in correspondence, so that 4 high-voltage three-phase alternating currents are output from the inverter to the permanent magnet motor, to drive the permanent magnet motor to operate. By means of a 4-path electromagnetic coupling technology in which the frequency converter is combined with the permanent magnet motor, the frequency conversion all-in-one machine of the present disclosure solves the technical problems of difficult low-speed control, difficult high-voltage driving, small starting torque, difficult IGBT voltage equalizing and the like in the existing frequency conversion all-in-one machines.

Figure 5:
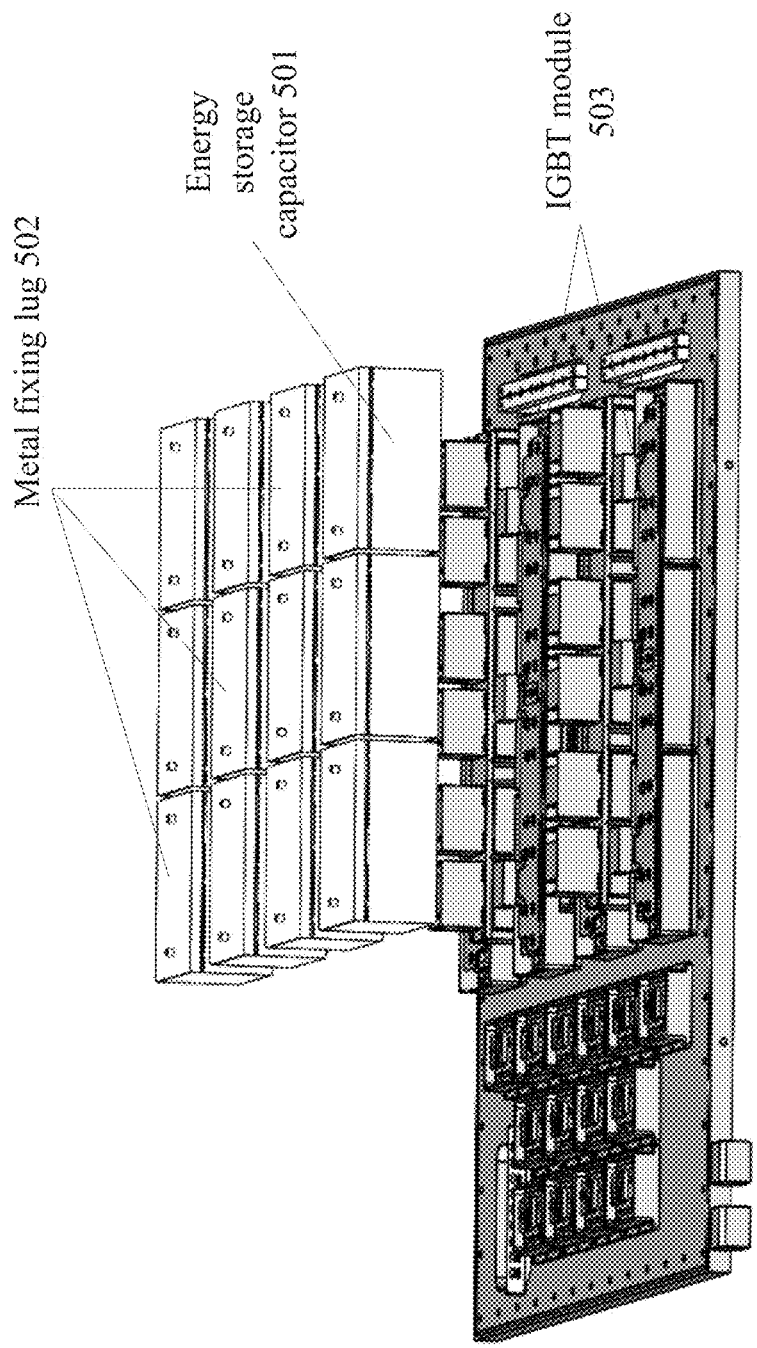
FIG. 5 is a diagram showing connections of an energy storage capacitor according to an embodiment of the present disclosure.

FIG. 5 is a diagram showing connections of an energy storage capacitor 501 according to an embodiment of the present disclosure.

As shown in FIG. 5, in the operation of the frequency conversion all-in-one machine of the present disclosure, the voltage value of the direct-current bus may reach more than 10,000 V, so the energy storage capacitor 501 of the present disclosure may be encapsulated with epoxy resin, and packaged without a case, which, on the one hand, reduces the volume of the energy storage capacitor; and on the other hand, increases the withstand voltage value between terminals and case as well as the creepage distance (for example, the withstand voltage value between terminals and case may reach 42 kV), and enlarges the electric gap between energy storage capacitors or between the energy storage capacitor and other components. Further, a top end of the energy storage capacitor of the present disclosure is packaged with metal fixing lugs 502, so that the energy storage capacitor is effectively and securely fixed. In addition, the energy storage capacitor of the present disclosure is connected to a circuit board where an IGBT module 503 is located in a plug-in mode, thereby facilitating installation and maintenance of the energy storage capacitor.

It should be understood that the terms "first", "second", "third", "fourth", and the like in the claims, description, and drawings of the present disclosure are used to distinguish between different objects, and are not intended to describe a particular order. The terms "comprise" and "include," when used in the description and claims of the present disclosure, specify the presence of stated features, integers, steps, operations, elements, and/or components, but do not preclude the presence or addition of one or more of other features, integers, steps, operations, elements, components, and/or combinations thereof.

It is also to be understood that the terminology used in the description of the present disclosure herein is for the purpose of describing particular embodiments only, and is not intended to limit the present disclosure. As used in the description and the claims of the present disclosure, the singular forms "a", "an" and "the" are intended to include the plural forms as well, unless the context clearly indicates otherwise. It should be further understood that the term "and/or" as used in the description and claims of the present disclosure refers to any and all possible combinations of one or more of the associated listed items and includes such combinations.

Although the implementations of the present disclosure have been described above, the description is only used for the purpose of facilitating understanding of the embodiments of the present disclosure, and is not intended to limit the scope and application scenarios of the present disclosure. Any modification and variation in the form and details of the embodiments can be made by any person skilled in the art of the present disclosure without departing from the spirit and scope of the present disclosure. However, the scope of protection of the disclosure is defined by the scope of the appended claims.

What is claimed is:

1. A high-voltage permanent magnet frequency conversion all-in-one machine, comprising:
 a frequency converter configured to perform frequency conversion on a high-voltage alternating current, and output at least three alternating currents;
 a permanent magnet motor configured to receive the alternating currents subjected to the frequency conversion and output from the frequency converter, to drive the permanent magnet motor to operate; and
 a controller configured to control the frequency converter to perform the frequency conversion on the high-voltage alternating current, and control an operation state of the permanent magnet motor;
 wherein the frequency converter includes a rectifier unit, a direct-current loop and an inverter unit,
 the rectifier unit is configured to convert the high-voltage alternating current into a direct current,
 the direct-current loop includes a direct-current bus and an energy storage capacitor, and is configured to buffer and store the direct current output from the rectifier unit,
 the inverter unit is configured to convert the direct current processed by the direct-current loop into at least three alternating currents to be output to the permanent magnet motor, and
 a stator winding of the permanent magnet motor is connected to a multi-path output end of the inverter in a multi-winding star connection mode.

2. The high-voltage permanent magnet frequency conversion all-in-one machine of claim 1, wherein the high-voltage alternating current has a voltage ranging from 6 to 10 KV.

3. The high-voltage permanent magnet frequency conversion all-in-one machine of claim 1, further comprising hall current transformers, wherein the hall current transformers are configured to collect the at least three alternating currents and output the collected signals to the controller to control the operation state of the permanent magnet motor.

4. The high-voltage permanent magnet frequency conversion all-in-one machine of claim 1, further comprising a pre-charging circuit, wherein the pre-charging circuit is arranged on an input end of the rectifier unit, and configured to pre-charge the energy storage capacitor in the direct-current loop through the high-voltage alternating current.

5. The high-voltage permanent magnet frequency conversion all-in-one machine of claim 1, further comprising a bus voltage sampling circuit, wherein the bus voltage sampling circuit is connected in parallel with the direct-current bus, and configured to sample a voltage value on the direct-current bus, and output a sampling result to the controller to control the frequency converter to perform frequency conversion on the high-voltage alternating current.

6. The high-voltage permanent magnet frequency conversion all-in-one machine of claim 1, further comprising a reactor, wherein the reactor is connected to an input end of the frequency converter, and configured to perform voltage stabilization and interference suppression on the high-voltage alternating current.

7. The high-voltage permanent magnet frequency conversion all-in-one machine of claim 1, wherein the energy storage capacitor is packaged without a case and connected in a plug-in mode, to increase a withstand voltage value between terminals and case, as well as an electric interval, and reduce a volume of the frequency converter.

8. The high-voltage permanent magnet frequency conversion all-in-one machine of claim 1, further comprising a static voltage equalizing circuit, wherein the static voltage equalizing circuit is connected between terminals of the direct-current bus, and configured to equalize a voltage of the inverter unit and discharge a voltage on the direct-current bus when the frequency converter is disconnected.

\* \* \* \* \*